United States Patent
Sakamoto et al.

(10) Patent No.: US 8,028,733 B2
(45) Date of Patent: Oct. 4, 2011

(54) GREEN TIRE AND METHOD FOR MANUFACTURING PNEUMATIC TIRE

(75) Inventors: Masayuki Sakamoto, Kobe (JP); Toshiaki Ono, Kobe (JP); Toshiyuki Mafune, Kobe (JP); Takamichi Sagawa, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 931 days.

(21) Appl. No.: 12/005,377

(22) Filed: Dec. 27, 2007

(65) Prior Publication Data

US 2008/0156407 A1    Jul. 3, 2008

(30) Foreign Application Priority Data

Dec. 28, 2006  (JP) ................................ 2006-354650
Dec. 28, 2006  (JP) ................................ 2006-355013

(51) Int. Cl.
*B60C 13/00* (2006.01)
*B29D 30/72* (2006.01)
(52) U.S. Cl. ........ 152/524; 152/510; 152/517; 156/117; 156/130.7
(58) Field of Classification Search ............. 156/117, 156/130, 397; 152/510, 517, 524, 525, 209.1
See application file for complete search history.

(56) References Cited

U.S. PATENT DOCUMENTS

| RE25,349 E | * | 3/1963 | Hanson ................. 156/130 |
| 4,286,643 A | * | 9/1981 | Chemizard et al. .......... 152/505 |
| 2005/0061412 A1 | * | 3/2005 | Noto et al. ................. 152/510 |
| 2005/0173041 A1 | | 8/2005 | Miki |
| 2006/0027309 A1 | * | 2/2006 | Hayashi et al. ............... 156/130 |

FOREIGN PATENT DOCUMENTS

JP   2001-191423 A  *  7/2001
JP   2005-225278 A     8/2005

* cited by examiner

*Primary Examiner* — Geoffrey L Knable
(74) *Attorney, Agent, or Firm* — Birch, Stewart, Kolasch & Birch, LLP

(57) ABSTRACT

A green tire includes a surface layer defining a green tire surface and made up of a plurality of windings of an unvulcanized rubber tape. A part of each of the windings is exposed on the green tire surface so that the exposed part has a width of from 50% to 80% of the width W1 of the rubber tape. Each of the windings has a substantially rhomboid cross section and has one end at an acute angle corner exposed on the green tire surface and the other end at the opposing acute angle corner. An angle theta of a diagonal line of the rhomboid drawn between the one end and the other end is not more than 30 degrees with respect to a tangential line to a profile line of the green tire surface.

14 Claims, 12 Drawing Sheets

GREEN TIRE AND METHOD FOR MANUFACTURING PNEUMATIC TIRE

BACKGROUND OF THE INVENTION

1. Technical Field

The present invention relates to a green tire and a method for manufacturing a pneumatic tire, the green tire having a surface layer defining a part of the green tire surface by a rubber tape laminate circumferentially wound on the green tire.

2. Related Art

A recently proposed pneumatic tire has its various rubber members, such as tread rubber, side wall rubber, and inner liner rubber, formed of a tape laminate that is made up of an unvulcanized rubber tape circumferentially wound on the tire. The idea of winding eliminates the need for a large rubber extruder and thus enables plant equipment to be miniaturized. Also there is no troublesome work conventionally required on every occasion when there was a change in kind of the tires to be manufactured, such as nozzle replacement for the rubber extruder and adjustments. Thus, the idea of winding can be highly advantageous for tires manufactured in a wide variety of kinds but in small quantities.

However, as shown in FIG. 12, a rubber member "a" formed by winding is weak in strength even after vulcanization at an interface J between adjacent windings g of the rubber tape, so that the interface J is exposed on the surface of the rubber member "a". In the case of the rubber member "a" being, for example, a side wall rubber a1, which is largely distorted on the surface during tire deformation, an exposed point Jp of the interface J serves as a starting point of cracking, thus posing the problem of degraded tire durability.

In view of this, a technique to inhibit cracking is disclosed in, for example, Japanese unexamined Patent Application Publication No. 2005-225278. This technique decreases the number of exposed points on the tire surface by forming the side wall rubber a1 of an inner layer with larger overlapping widths of the rubber tape and a surface layer with smaller overlapping widths. However, a study conducted by the present inventors has revealed that cracking is difficult to inhibit on a sufficient level only by a decrease in the number of exposed points, especially in the case of running under the severe conditions of low internal pressure and overload.

Pneumatic tires include what is called self-supporting run-flat tires, which are known to enable the vehicle to be driven safely over some distances at relatively high speeds even when the air within the tire is greatly reduced because of puncture and the like. The run-flat tire is provided with a side reinforcing rubber substantially in the form of a crescent on the inner cavity side of the side wall portion. Recently, an attempt is being made to form the side reinforcing rubber of a tape laminate. However, even the run-flat tire is largely deformed during the run-flat occasion, which excessively distorts the inner surface (inner cavity surface) of the side reinforcing rubber. Thus, cracking on the side reinforcing rubber is difficult to inhibit on a sufficient level by the technique disclosed in the JP2005-225278 publication. Thus, there is a need for further improvement in winding.

SUMMARY OF THE INVENTION

It is a first object of the present invention to provide a green tire that is especially suitable for a pneumatic tire having its side wall rubber or side reinforcing rubber formed of a tape laminate, and that is capable of inhibiting cracking on a higher level to significantly improve tire durability, even in the case of running under the severe conditions of low internal pressure and overload or in the case of running in a punctured state. And it is a second object of the present invention to provide a method for manufacturing a pneumatic tire with using the green tire.

According to the first present invention, a green tire includes a surface layer defining a green tire surface and made up of a plurality of windings of at least one unvulcanized rubber tape having a tape width W1 of from 5 to 50 mm. In the surface layer, the windings are each overlapped with the adjacent windings, and a part of each of the windings is exposed on the green tire surface so that the exposed part has a width (Wa) in a range of from 50% to 80% of the tape width (W1). Each winding has a cross-sectional shape being substantially rhomboid and having one end at an acute angle corner exposed on the green tire surface and the other end at the opposing acute angle corner. An angle theta of a diagonal line of the rhomboid drawn between the one end and the other end is not more than 30 degrees with respect to a tangential line to a profile line of the green tire surface at an point corresponding to the one end on the profile line. The profile line is defined as a line smoothly contacting to exposed surface of each exposed part. The point corresponding to the one end is defined as a point at which a line passing through the one end crosses at right angle to the profile line.

According to the second present invention, a method for manufacturing a pneumatic tire comprises a step of building a green tire which has a surface layer defining a green tire surface, and a step of heating the green tire. The step of building the green tire includes a step of forming the surface layer by a plurality of windings of at least one unvulcanized rubber tape having a tape width W1 of from 5 to 50 mm, in the surface layer. The windings are each overlapped with the adjacent windings. A part of each of the windings is exposed on the green tire surface so that the exposed part has a width (Wa) in a range of from 50% to 80% of the tape width (W1). Each the winding has a cross-sectional shape being substantially rhomboid and having one end at an acute angle corner exposed on the green tire surface and the other end at the opposing acute angle corner. An angle theta of a diagonal line of the rhomboid drawn between the one end and the other end is not more than 30 degrees with respect to a tangential line to a profile line of the green tire surface at an point corresponding to the one end on the profile line. The profile line is defined as a line smoothly contacting to exposed surface of each exposed part. The point corresponds to the one end defined as a point at which a line passing through the one end crosses at right angle to the profile line.

In the green tire of the present invention, the surface of the side wall rubber or the side reinforcing rubber, which is made up of, for example, a tape laminate, is covered with a surface layer. The surface layer is also made up of a tape laminate. The width Wa of the exposed part, which is a part of each of the windings of the rubber tape exposed on the green tire surface, is not less than 50% of the tape width W1, thereby reducing the number of exposed points of the interfaces between the windings.

The winding of the rubber tape has a substantially rhomboid cross-sectional shape, and an angle theta of a diagonal line drawn between the ends of acute angle corners of the rhomboid is not more than 30 degrees with respect to a tangential line to a profile line of the green tire surface. In this manner, the rubber tape is laid down to approximate the diagonal line to the inclination of the profile line. This also approximates the interface to the inclination of the profile line. This enables it to keep large the length of the interface, which is the length of contact between the windings, while making the surface layer thin. Further, the shear stress acting on the interface when the tire is deformed by bending can be reduced. The reduction in shear stress, combined with the decrease in the number of exposed points, effectively inhibits cracking that causes peeling off of the interfaces starting from the exposed points.

Since the tape laminate has a concave-convex surface, during vulcanization, spaces occur each having a substantially triangle cross section defined by the exposed point and the surface of the mold. Although the spaces are filled with rubber that is allowed to flow during vulcanization, large spaces are left as minute flaws or dents, which disfigure appearance or serve as starting points of cracking. Contrarily, the present invention minimizes such spaces. This inhibits flaws and dents, thereby further inhibiting cracking and improving appearance.

BRIEF DESCRIPTION OF THE DRAWINGS

Embodiments of the present invention will now be described in detail in conjunction with the accompanying drawings.

PREFERRED EMBODIMENT OF THE INVENTION

Figure 1:
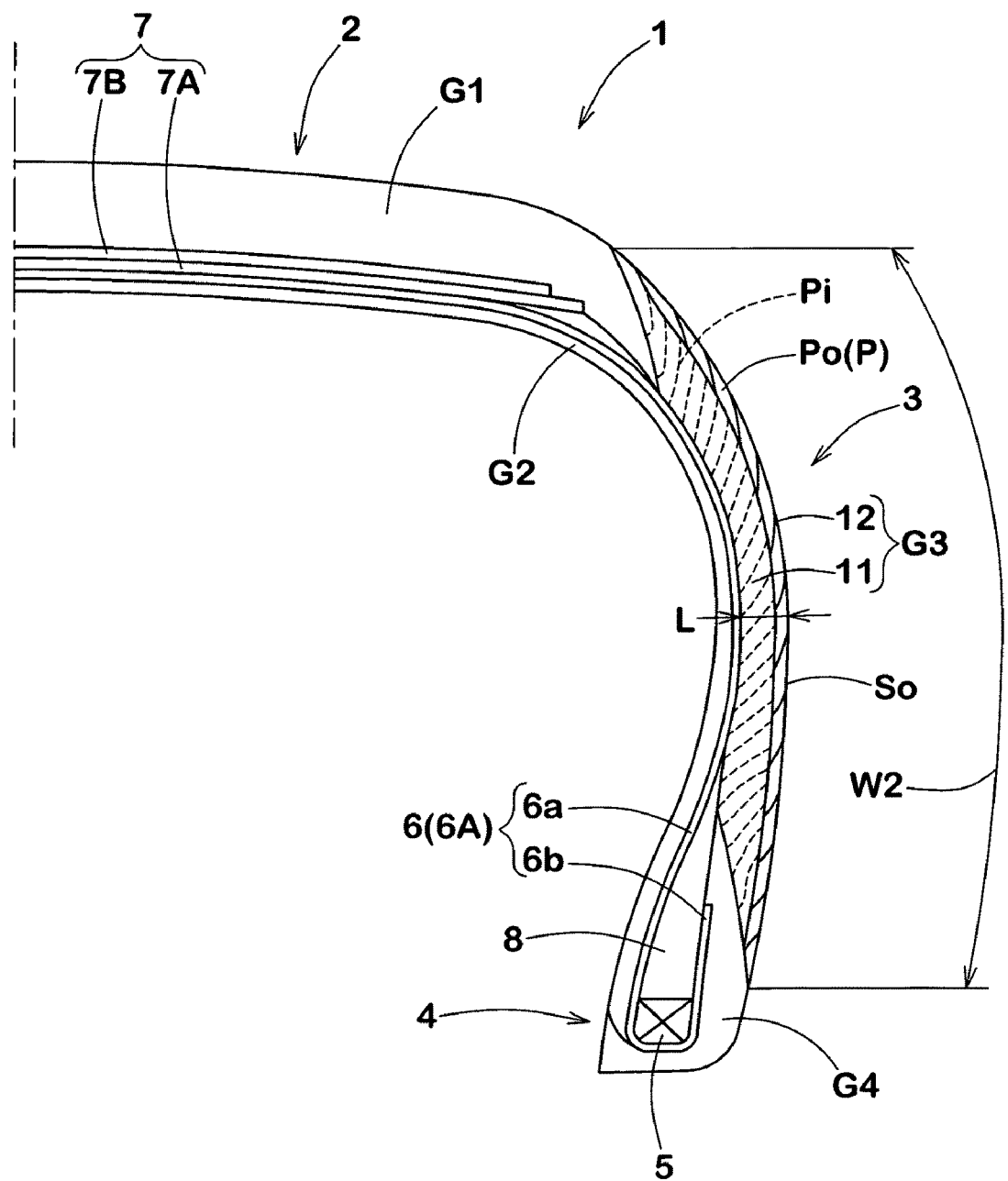
FIG. 1 is a cross sectional view of a green tire according to a first embodiment of the present invention.
Figure 7:
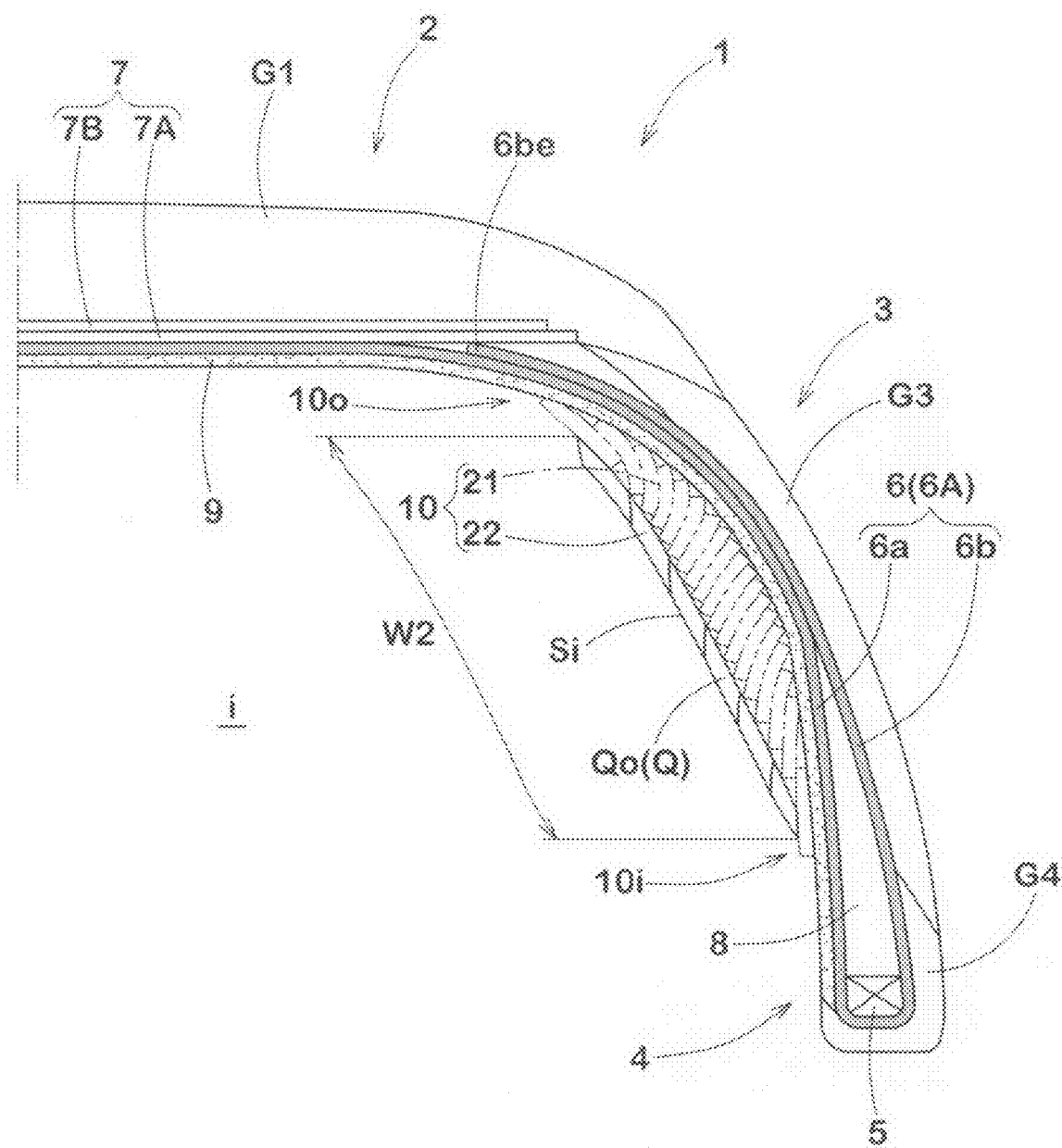
FIG. 7 is a cross sectional view of a green tire according to a second embodiment of the present invention.
Figure 8:
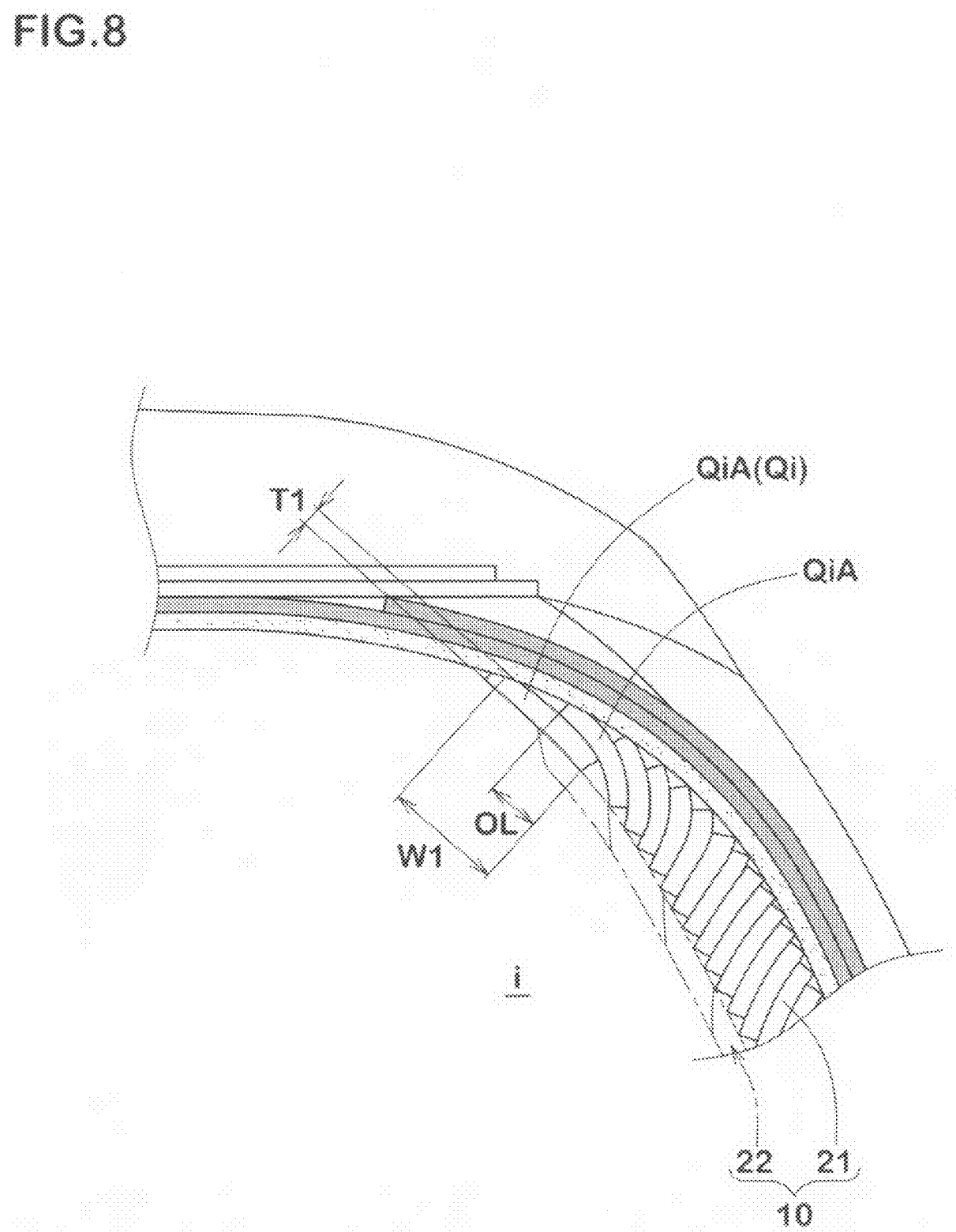
FIG. 8 is a cross sectional view of an inner layer of a side reinforcing rubber.

FIG. 1 is a cross sectional view of a green tire according to a first embodiment, and FIG. 7 is a cross sectional view of a green tire according to a second embodiment.

The method for manufacturing the pneumatic tire comprises a step of building a green tire which has a surface layer defining a green tire surface, and a step of heating the green tire. The step of building the green tire includes a step of forming the surface layer 12 by a plurality of windings PoA of at least one unvulcanized rubber tape Po having a tape width W1 of from 5 to 50 mm, in the surface layer.

The green tire formed in the step of heating the green tire as shown in FIG. 1 is for a radial tire of a passenger car, and has rubber members G of various kinds with different rubber compositions and a carcass 6 serving as the framework of the tire.

The carcass 6 is formed of at least one carcass ply 6A, one in this example, having carcass cords arranged at an angle of from 70 to 90 degrees with respect to the circumferential direction of the tire. The carcass ply 6A has a ply body portion 6a extensive from a tread portion 2 through a side wall portion 3 to a bead core 5 of a bead portion 4, and at both ends of and integrally with the ply body portion 6a, a turned-up portion 6b turned up axially outwardly over the bead core 5 and held. Between the ply body portion 6a and the turned-up portion 6b, a bead apex rubber 8 for bead reinforcement is arranged extensive radially outwardly from the bead core 5.

A belt layer 7 is arranged further radially outwardly than the carcass 6 and inside the tread portion 2. The belt layer 7 is formed of a plurality of belt plies, two belt plies 7A and 7B in this example, having belt cords arranged at an angle of, for example, from 10 to 35 degrees with respect to the circumferential direction of the tire. In the belt layer 7, the belt cords of the belt ply 7A cross those of the belt ply 7B to enhance belt rigidity and reinforce the tread portion 2 by the hoop effect.

The rubber members G may include a tread rubber G1 arranged on the tread portion 2 to constitute the ground surface, a side wall rubber G3 arranged on the axially outer side of the carcass 6 and constituting an outer surface so of the side wall portion 3, an inner liner rubber G2 arranged on the inner side of the carcass to constitute the inner cavity surface of the tire, and a clinch rubber G4 arranged on the bead proton 4 to prevent the tire from being dispositioned from the rim.

In the green tire 1 according to the first embodiment, the side wall rubber G3 among the tire-dedicated rubber members G is formed of a wound tape assembly. In this example, what is called an SOT (sidewall over Tread) structure is exemplified, where the radially outer end of the tread rubber G3 covers the axially outer end of the tread rubber G1. A reverse structure, i.e., what is called a TOS (Tread Over Sidewall) structure, where the radially outer end of the tread rubber G3 is covered by the axially outer end of the tread rubber G1, may be used.

The side wall rubber G3 is composed of an inner layer 11 arranged on the carcass side and a surface layer 12 superposed on the inner layer 11 and constituting a part of the outer surface so of the side wall portion 3. The surface layer 12 constitutes not less than 80% of the outer surface so of the side wall portion 3. The inner layer 11 and the surface layer 12 are each formed of a plurality of windings of an unvulcanized rubber tape P.

Figure 2:
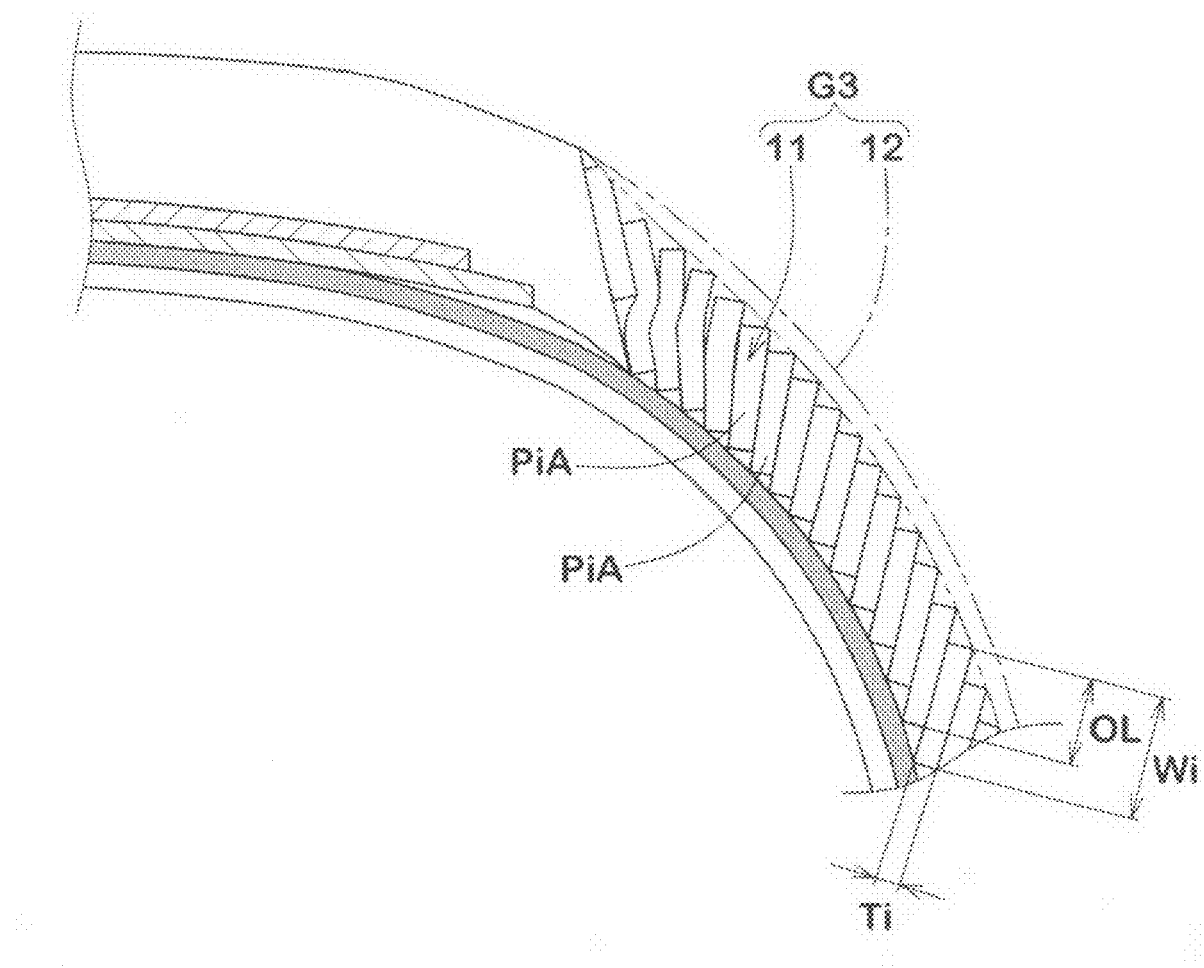
FIG. 2 is a cross sectional view of an inner layer of a side wall rubber.
Figure 3A:
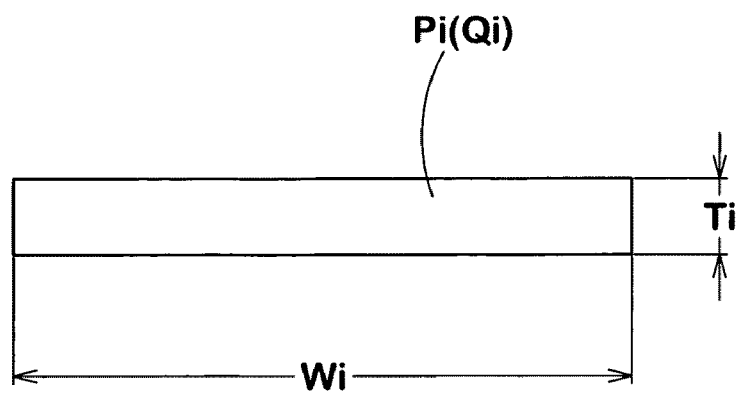
FIG. 3A is a cross sectional view of an inner rubber tape.

As shown in FIG. 2, the inner layer 11 constitutes a main part of the side wall rubber G3 and therefore has a profile approximate to a cross sectional shape required of the side wall rubber G3. For this purpose, as shown in FIG. 3A, the inner layer 11 is formed of an inner tape Pi having a substantially rectangular cross section with a width Wi of from 5 to 50 mm and a thickness Ti of from 0.3 to 5.0 mm, preferably from 1.0 to 3.0 mm. The inner tape Pi is wound while the overlapping width OL is varied appropriately. The overlapping width OL is preferably in the range of from 5 to 95% of the width Wi. Outside this range, the desired profile is difficult to obtain.

Figure 3B:
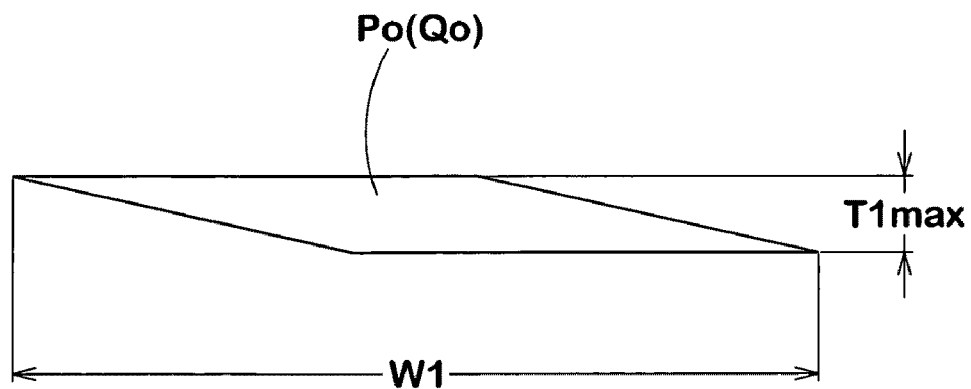
FIG. 3B is a cross sectional view of an outer rubber tape.
Figure 4:
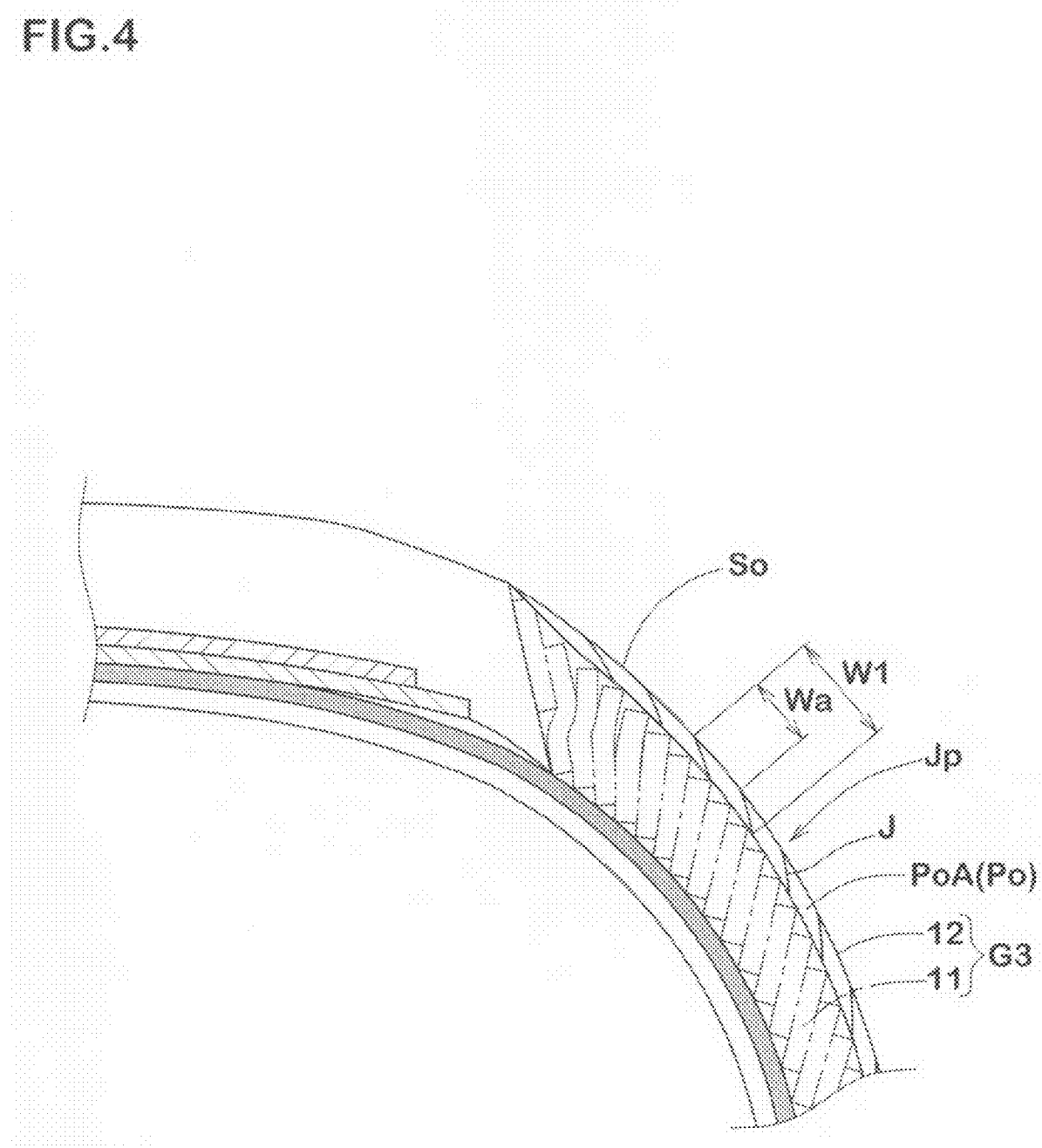
FIG. 4 is a cross sectional view of a surface layer of the side wall rubber.
Figure 5A:
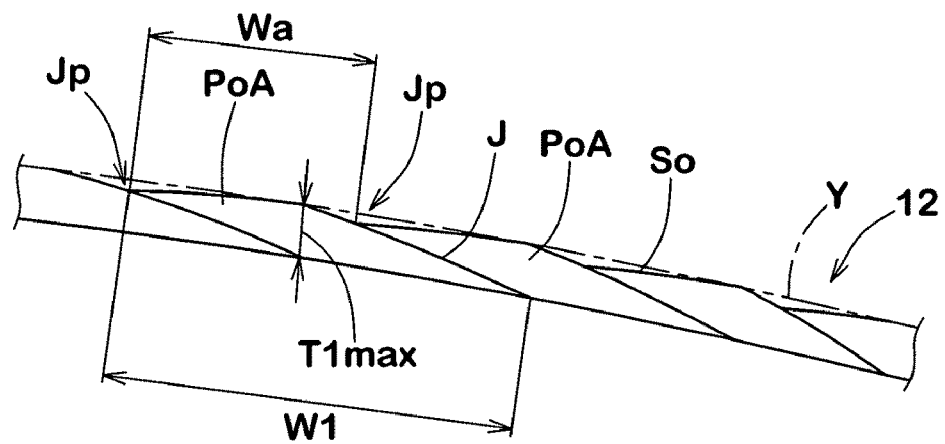
FIGS. 5A and 5B are enlarged cross sectional views of the surface layer.

The surface layer 12 is for covering the outer surface of inner layer 11 to protect it and is in a sheet form of a substantially uniform thickness. As shown in FIG. 3B, the surface layer 12 is formed of an outer rubber tape Po, which has a rhomboid cross section that tapers toward both ends to reduce their thickness. Accordingly, a winding PoA of the rubber tape Po also has a substantially rhomboid cross section. The tape width W1 of the outer rubber tape Po is in the range of from 5 to 50 mm, and as shown in FIGS. 4 and 5, a width Wa of an exposed part of the winding PoA constituting the outer surface so is in the range of from 50 to 80% of the tape width W1. Setting the width Wa of the exposed part of the winding PoA at not less than 50% of the tape width W1 decreases the number of exposed points Jp, which are interfaces J between the windings PoA exposed on the outer surface So. The width Wa is also preferably not less than 5.0 mm, below which the stress during deformation by bending concentrates on the winding PoA thereby failing to inhibit cracking. If the width Wa exceeds 80% of the tape width W1, connection between the windings PoA is insufficient.

Figure 5B:
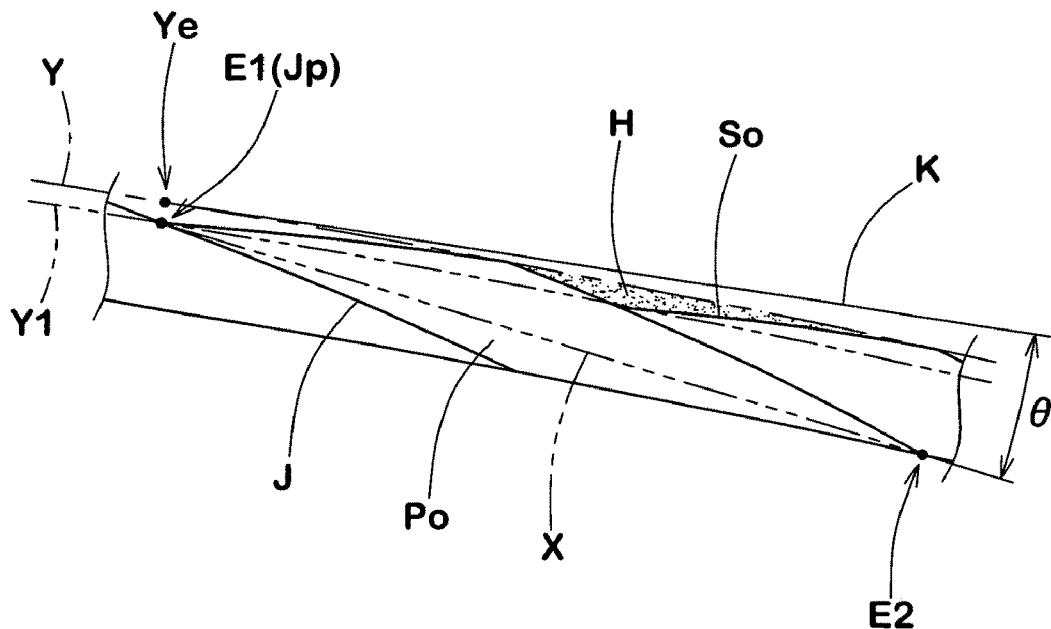

As shown in FIG. 5B, the winding PoA has one end E1 at the acute angle corner exposed on the outer surface So and another end E2 at the other acute angle corner. The one end E1 constitutes the exposed point Jp. An angle theta of a diagonal line X of the winding PoA drawn between the one end E1 and the other end E2 is not more than 30 degrees with respect to a tangential line K to a profile line Y of the outer surface So of the side wall portion 3.

The term tangential line K, as used herein, refers to a tangential line to the profile line Y at a point Ye thereon corresponding to the one end E1. The "point Ye corresponding to the one end E1," as used herein, refers to a point at which a line passing through the one end E1 crosses at right angle to the profile line Y. The term profile line Y, as used herein, refers to a line smoothly contacting to the exposed surface of each winding PoA, and is substantially parallel to a line Y1 smoothly connecting the one ends E1.

Setting the angle theta of the diagonal line X at not more than 30 degrees approximates the interface J between the windings PoA to the inclination of the profile line Y. This reduces the shear stress acting on the interface J when the side wall portion 3 is deformed by bending. This also enables it to keep large the length of the interface J while making the surface layer 12 thin, thereby enhancing the connection strength between the windings PoA. These advantageous effects, combined with the decrease in the number of exposed points Jp, effectively inhibit cracking that causes peeling off of the interfaces J starting from the exposed points Jp. Further, the outer surface so is approximated to the profile line Y, thereby minimizing a space defined by the outer surface So and the profile line Y, in particular a space H having a substantially triangle cross section that occurs at the exposed point Jp. This prevents flaws and dents from occurring on the space H that is otherwise caused by a lack of rubber flow during vulcanization. As a result, cracking and disfigurement of appearance are inhibited.

For the foregoing advantageous effects, the angle theta is preferably not more than 20 degrees, more preferably not more than 10 degrees, further more preferably not more than 5 degrees. In such green tire 1, the interface J and the diagonal line X can be identified to a degree even in the vulcanized state. Also the angle of the diagonal line X with respect to the outer surface of the side wall portion of the vulcanized tire is kept within the above specified range.

At least 80%, preferably 90%, of the windings PoA, which constitute the surface layer 12, meet the above specified ranges of the width Wa and the angle theta.

The outer rubber tape Po preferably has a maximum thickness $T1_{max}$ of from 0.3 to 5.0 mm. Below 0.3 mm, the strength of the outer rubber tape Po itself becomes excessively small, thereby failing to cover and protect the inner layer 11. This creates a tendency toward cracking starring from the interface between the windings PiA of the inner layer 11. This also creates a tendency toward accumulation of air between the inner layer 11 and the surface layer 12. If the maximum thickness $T1_{max}$ exceeds 5.0 mm, the thickness of the side wall rubber G3 becomes excessively large, thereby causing degraded riding comfortability and a reduction in rolling resistivity due to an increase in weight. In view of this, the upper limit of the maximum thickness $T1_{max}$ is preferably not more than 3.0 mm, and the lower limit is preferably not less than 1.0 mm.

The number n of times of winding the outer rubber tape Po of the surface layer 12 preferably meets the following formula (1):

$$N \leq 2.0 \times (W2/W1) \tag{1}$$

wherein W2 denotes a width measured along the outer surface so of the surface layer 12.

If the number n of winding is more than twice the ratio W2/W1, the number of exposed points Jp increases, which is disadvantageous to inhibiting cracking. If the number n of winding is excessively small, connection between the windings PoA is insufficient, thereby causing a space between the windings PoA in some cases. This results in a tendency toward degraded winding workability. In view of this, the upper limit of the number n of winding is preferably not more than 1.8 times the ratio W2/W1, more preferably not more than 1.6 times the ratio W2/W1, and the lower limit is preferably not less than 1.2 times, more preferably not less than 1.4 times.

Figure 6A:
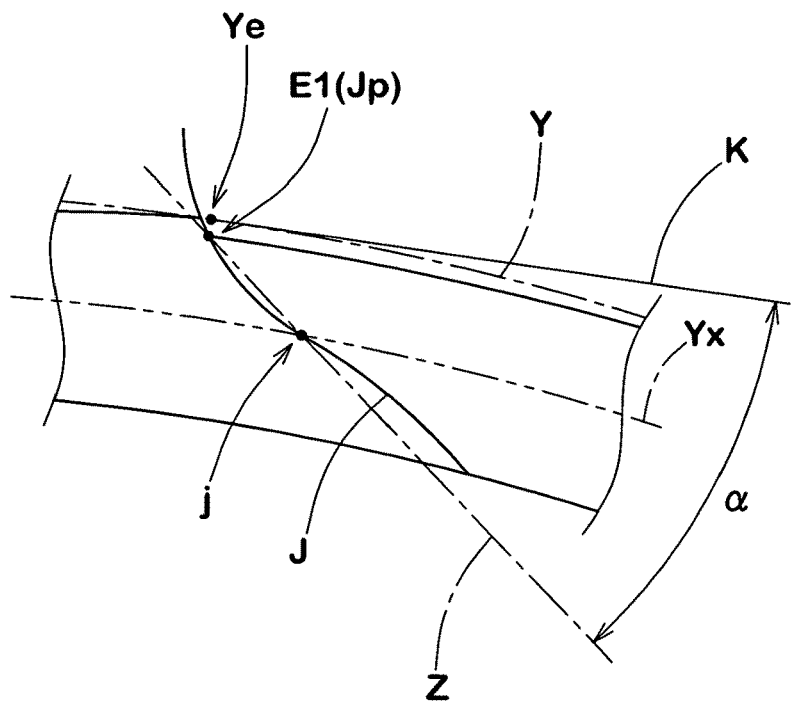
FIGS. 6A and 6B are enlarged cross sectional views of an interface of the surface layer.

To enhance the effect of inhibiting cracking, as shown in enlarged scale in FIG. 6A, an intersecting angle alpha of a straight line z connecting a point j and the one end E1 with respect to the tangential line K to the profile line Y is not more than 30 degrees, the point j being on the interface J at a distance of 1 mm inwardly from the one end E1 at right angle to the profile line Y. As described above, the tangential line K refers to a tangential line to the profile line Y at a point Ye thereon corresponding to the one end E1. The point j is also a point of intersection between the interface J and an imaginary reference line Yx extensive in parallel to the profile line Y at a distance of 1 mm inwardly from the one end E1.

Figure 6B:
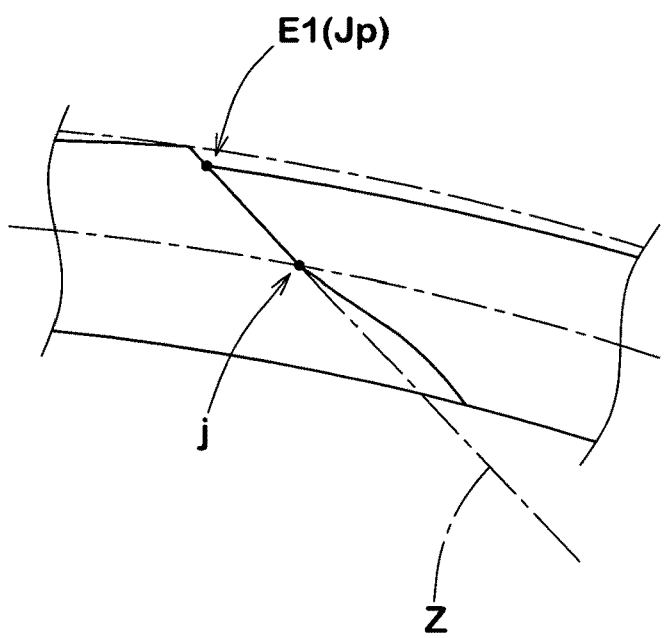

Setting the intersecting angle alpha at not more than 30 degrees further reduces the shear stress acting on the interface J at the one end E1 when the side wall portion 3 is deformed by bending, thereby more effectively inhibiting cracking that causes peeling off of the interface J. Preferably, as shown in FIG. 6B, the interface J does not protrude beyond the straight line Z in the direction in which the angle alpha increases. This further reduces the shear stress acting on the interface J.

FIG. 7 shows a cross sectional view of a green tire 1 according a second embodiment. The green tire 1 according the second embodiment is dedicated to a run-flat tire and includes, as a rubber member G, a side reinforcing rubber 10 having a substantially triangle cross section. The side reinforcing rubber 10 is arranged on the inner surface of the carcass 6 and constitutes an inner surface Si of the side wall portion 3.

Similarly to the first embodiment, the carcass 6 is formed of at least one carcass ply 6A, one in this example, having carcass cords arranged at an angle of from 70 to 90 degrees with respect to the circumferential direction of the tire. Between the ply body portion 6a and the turned-up portion 6b of the carcass ply 6A, the bead apex rubber 8 is arranged. In this example, to enhance the run-flat performance, the radial outer end of the turned-up portion 6b is radially extensive beyond the radial outer end of the bead apex rubber 8, and a radial outer end 6be of the turned-up portion 6b is terminated between the ply body portion 6a and the belt layer 7. This effectively reinforces the side wall portion 3 even though only one carcass ply 6A is provided.

Also similarly to the first embodiment, the belt layer 7 is formed of a plurality of belt plies, two belt plies 7A and 7B in this example, having belt cords arranged at an angle of, for example, from 35 degrees with respect to the circumferential direction of the tire. The belt cords of the belt ply 7A cross those of the belt ply 7B to enhance belt rigidity and reinforce the tread portion 2 by the hoop effect.

On the inner side of the carcass 6, the side reinforcing rubber 10 is dispose via the inner liner rubber 9.

The inner liner rubber 9 is made of a rubber (e.g., butyl-based rubber) having a property of barrier against gas and extensive between the bead portions 4 as if to surround an inner cavity i of the tire. Examples of the butyl-based rubber include butyl rubber and halogenated butyl rubber.

The side reinforcing rubber 10 has a crescent cross section, which has a gradually reducing thickness from the middle thereof toward a radially inner end 10i and a radially outer end 10o. The inner end 10i is preferably further radially inward than the radial outer end of the bead apex rubber 8 and further radially outward than the bead core 5. This eliminates a portion of low rigidity between the side reinforcing rubber 10 and the bead apex rubber 8, thereby improving bending rigidity in a well balanced manner over the side wall portion 3 and the bead portion 4.

The radially outer end 10o is preferably terminated at a position further axially inward than the axial end of the belt layer 7. This clears a buttress and the like of a portion of significantly low rigidity.

In the green tine 1 according to the second embodiment, the side reinforcing rubber 10 is formed of a wound tape assembly. The side reinforcing rubber 10 is composed of an inner layer 21 arranged on the carcass side and a surface layer 22 superposed on the inner layer 21 and constituting a part of the inner surface Si of the side wall portion 3. The surface layer 22 constitutes not less than 80% of the inner surface Si of the side wall portion 3. The inner layer 21 and the surface layer 22 are each formed of a plurality of windings of an unvulcanized rubber tape Q.

The inner layer 21, similarly to the inner surface 11, constitutes a main part of the side reinforcing rubber 10 and therefore has a profile approximate to a cross sectional shape required of the side reinforcing rubber 10. For this purpose, as shown in FIG. 3A, the inner layer 21 is formed of an inner tape Qi having a substantially rectangular cross section with a width Wi of from 5 to 50 mm and a thickness Ti of from 0.3 to 5.0 mm, preferably from 1.0 to 3.0 mm. The inner tape Qi is wound while the overlapping width OL is varied appropriately. The overlapping width OL is preferably in the range of from 5 to 95% of the width Wi. Outside this range, the desired profile is difficult to obtain.

Figure 9:
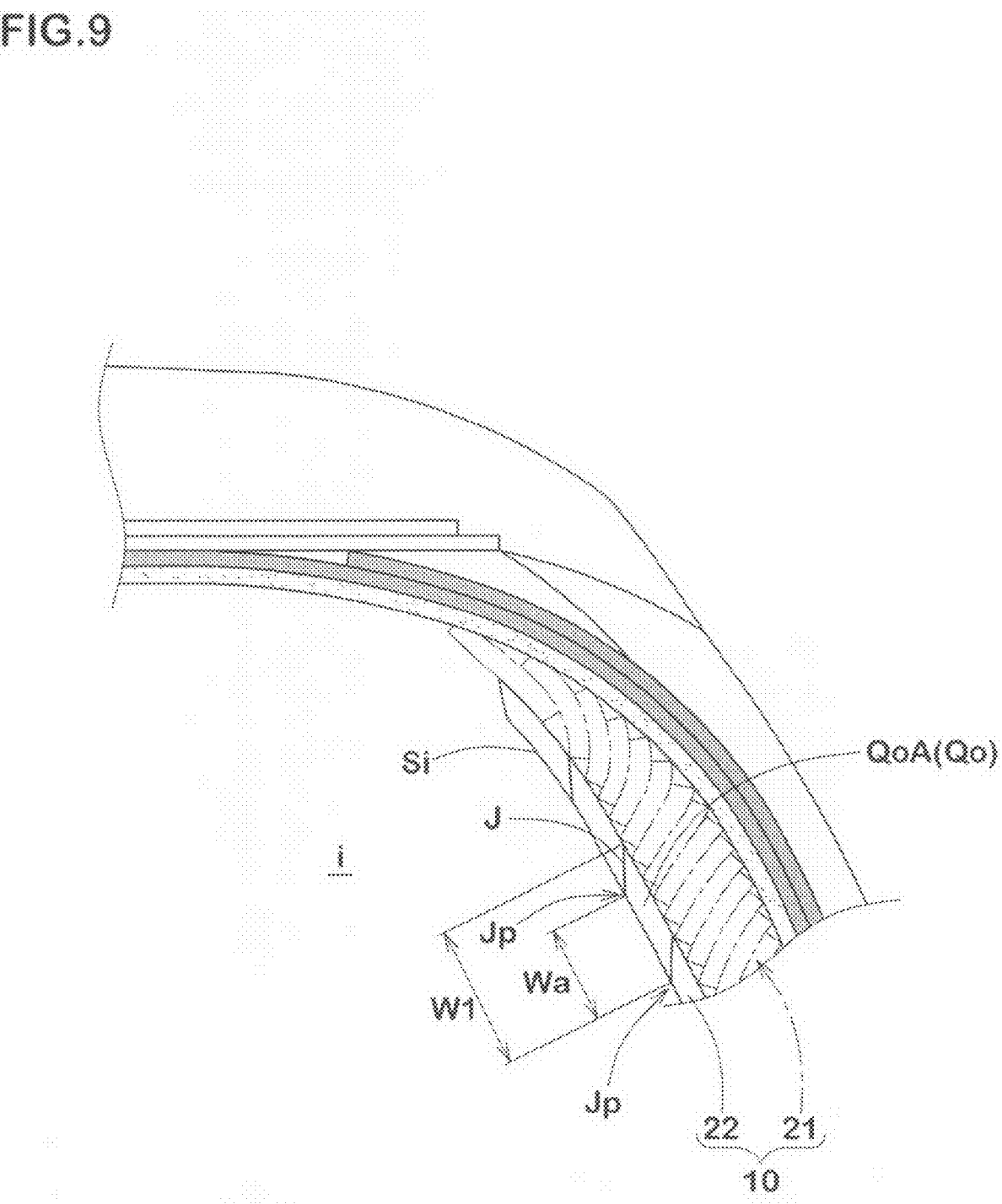
FIG. 9 is a cross sectional view of a surface layer of the side reinforcing rubber.
Figure 10A:
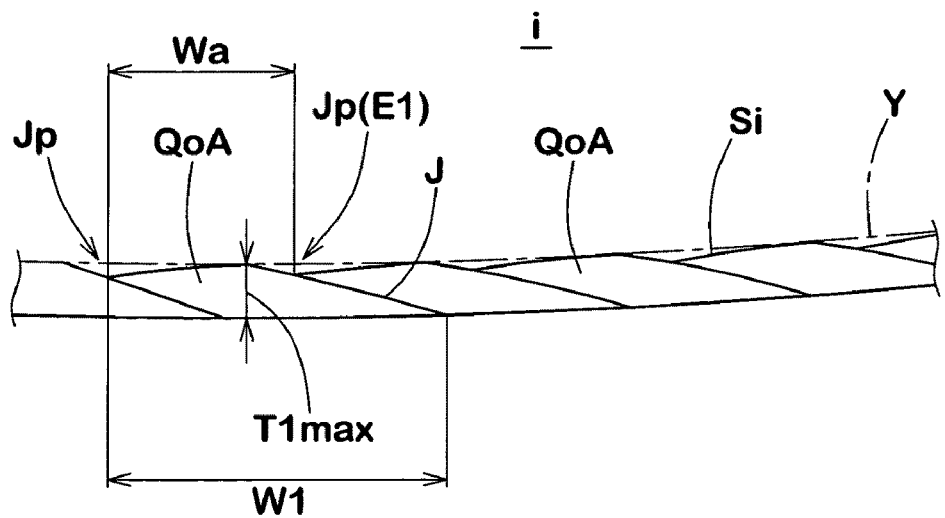
FIGS. 10A and 10B are enlarged cross sectional views of the surface layer.

The surface layer 22, similarly to the surface layer 12, is for covering the outer surface of inner layer 21 to protect it and is in a sheet form of a substantially uniform thickness. AS shown in FIG. 3B, the surface layer 22 is formed of an outer rubber tape Qo, which has a substantially rhomboid cross section. Accordingly, a winding QoA of the rubber tape Qo also has a substantially rhomboid cross section. The tape width W1 of the outer rubber tape Qo is in the range of from 5 to 50 mm, and as shown in FIGS. 9 and 10, a width Wa of an exposed part of the winding QoA exposed on the inner surface Si is in the range of from 50 to 80% of the tape width W1. Setting the width Wa at not less than 50% of the tape width W1 decreases the number of exposed points Jp, which are interfaces J between the windings QoA exposed on the inner surface Si. The width Wa is also preferably not less than 5.0 mm, below which the stress during deformation by bending concentrates on the winding QoA thereby failing to inhibit cracking. If the width Wa exceeds 80% of the tape width W1, connection between the windings QoA is insufficient.

Figure 10B:
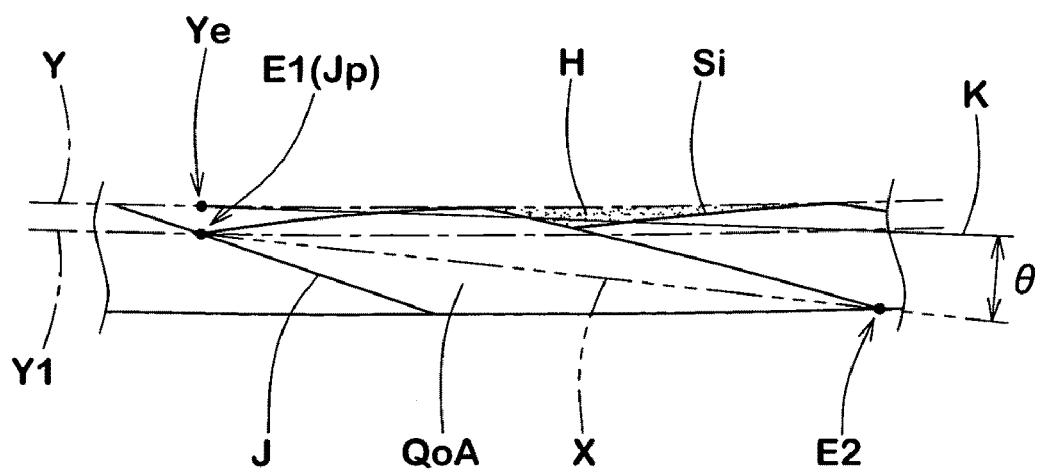

AS shown in FIG. 10B, the winding QoA has one end E1 at the acute angle corner exposed on the inner surface Si and another end E2 at the other acute angle corner. The one end E1 constitutes the exposed point Jp. An angle theta of a diagonal line X of the winding QoA drawn between the one end E1 and the other end E2 is not more than 30 degrees with respect to a tangential line K to a profile line Y of the inner surface Si of the side wall portion 3.

The term tangential line K refers to a tangential line to the profile line Y at a point Ye thereon corresponding to the one end E1. The "point Ye corresponding to the one end E1" refers to a point at which a line passing through the one end E1 crosses at right angle to the profile line Y. The term profile line Y refers to a line smoothly contacting to the exposed surface of each winding QoA, and is substantially parallel to a line Y1 smoothly connecting the one ends E1.

Setting the angle theta of the diagonal line X at not more than 30 degrees approximates the interface J between the windings QoA to the inclination of the profile line Y. This reduces the shear stress acting on the interface J when the side wall portion 3 is deformed by bending. This also enables it to keep large the length of the interface J while making the surface layer 22 thin, thereby enhancing the connection strength between the windings QoA. These advantageous effects, combined with the decrease in the number of exposed points, effectively inhibit cracking that causes peeling off of the interfaces J starting from the exposed points Jp. Further, the inner surface Si is approximated to the profile line Y, thereby minimizing a space defined by the inner surface Si and the profile line Y, in particular a space H having a substantially triangle cross section that occurs at the exposed point Jp. This prevents flaws and dents from occurring on the space H that is otherwise caused by a lack of rubber flow during vulcanization. As a result, cracking and disfigurement of appearance are inhibited.

For the foregoing advantageous effects, the angle theta is preferably not more than 20 degrees, more preferably not more than 10 degrees, further more preferably not more than 5 degrees. At least 80%, preferably 90%, of the windings QoA, which constitute the surface layer 22, meet the above specified ranges of the width Wa and the angle theta.

The outer rubber tape Qo preferably has a maximum thickness $T1_{max}$ of from 0.3 to 5.0 mm. Below 0.3 mm, the strength of the outer rubber tape Qo itself becomes excessively small, thereby failing to cover and protect the inner layer 21. This creates a tendency toward cracking starring from the interface between the windings QiA of the inner layer 21. This also creates a tendency toward accumulation of air between the inner layer 21 and the surface layer 22. If the maximum thickness $T1_{max}$ exceeds 5.0 mm, the thickness of the side reinforcing rubber 10 becomes excessively large, thereby causing degraded riding comfortability and a reduction in rolling resistivity due to an increase in weight. In view of this, the upper limit of the maximum thickness $T1_{max}$ is preferably not more than 3.0 mm, and the lower limit is preferably not less than 1.0 mm.

The number n of times of winding the outer rubber tape Qo of the surface layer 22 preferably meets the following formula (1):

$$N \leq 2.0 \times (W2/W1) \tag{1}$$

wherein W2 denotes a width measured along the inner surface Si of the surface layer 22.

If the number n of winding is more than twice the ratio W2/W1, the number of exposed points Jp increases, which is disadvantageous to inhibiting cracking. If the number n of winding is excessively small, connection between the windings QoA is insufficient, thereby causing a space between the windings QoA in some cases. This results in a tendency toward degraded winding workability. In view of this, the upper limit of the number n of winding is preferably not more than 1.8 times the ratio W2/W1, more preferably not more than 1.6 times the ratio W2/W1, and the lower limit is preferably not less than 1.2 times, more preferably not less than 1.4 times.

Figure 11A:
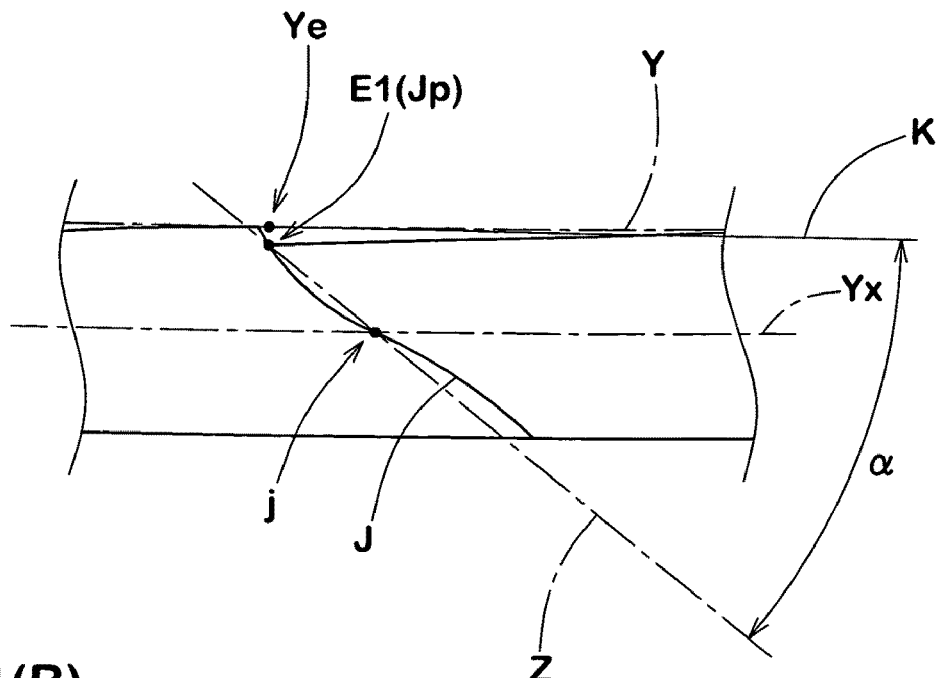
FIGS. 11A and 11B are enlarged cross sectional views of an interface of the surface layer.

To enhance the effect of inhibiting cracking, as shown in enlarged scale in FIG. 11A, an intersecting angle alpha of a straight line Z connecting a point j and the one end E1 with respect to the tangential line K to the profile line Y is not more than 30 degrees, the point j being on the interface J at a distance of 1 mm inwardly from the one end E1 at right angle to the profile line Y.

Figure 11B:
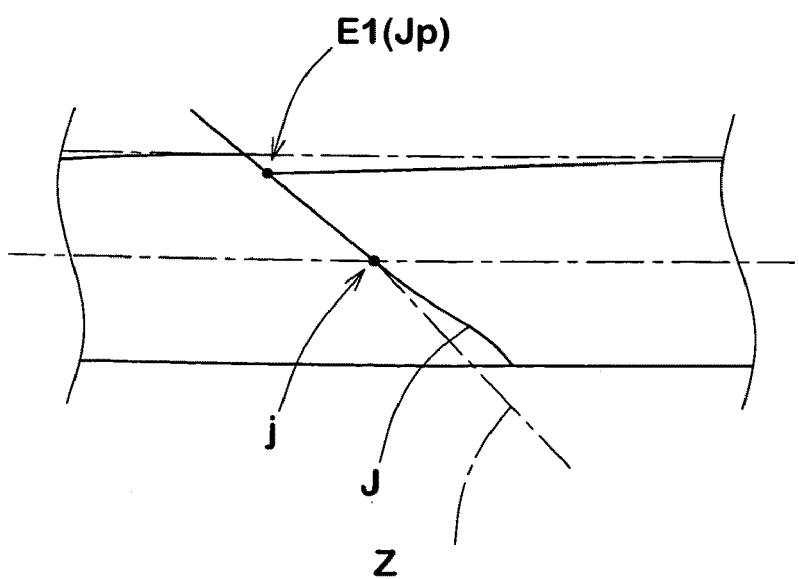
Figure 12:
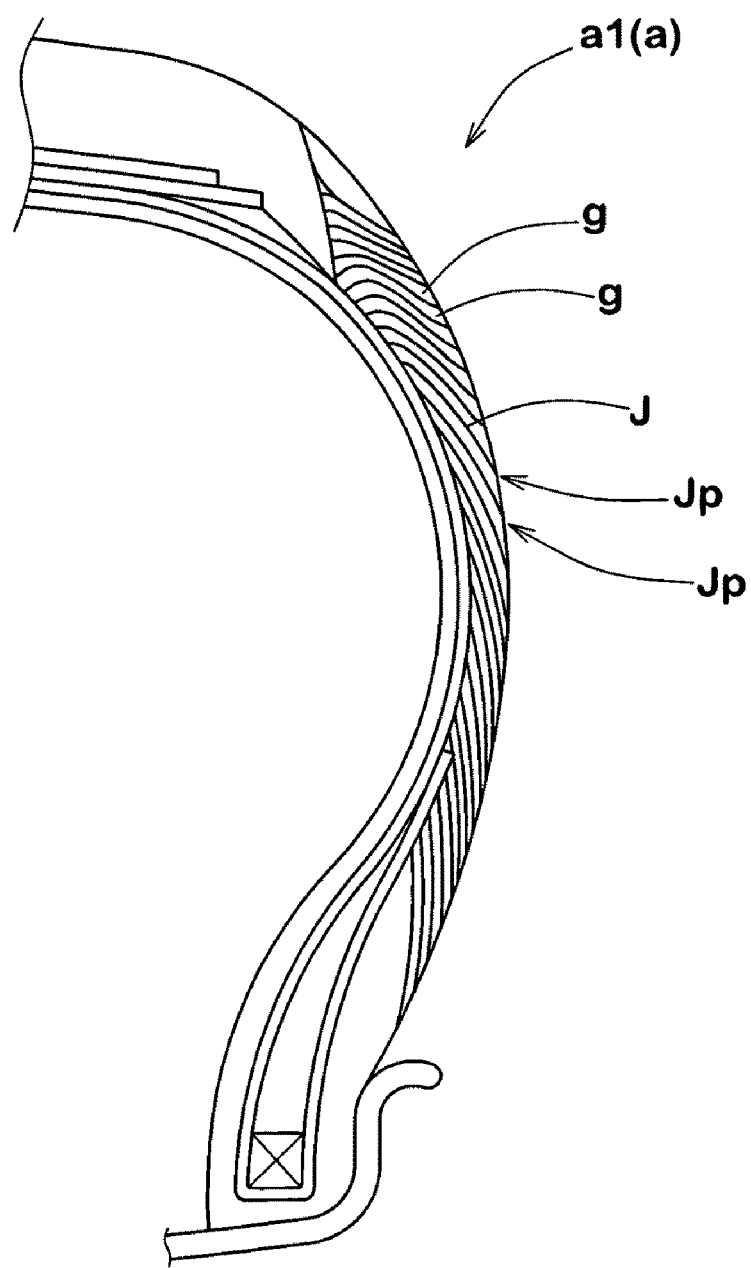
FIG. 12 is cross sectional view of a conventional green tire for describing problems encountered in this green tire.

Setting the intersecting angle alpha at not more than 30 degrees further reduces the shear stress acting on the interface J at the one end E1 when the side wall portion 3 is deformed by bending, thereby more effectively inhibiting cracking that causes peeling off of the interface J. Preferably, as shown in FIG. 11B, the interface J does not protrude beyond the straight line Z in the direction in which the angle alpha increases. This further reduces the shear stress acting on the interface J.

The method for manufacturing the pneumatic tire according to the present invention is favorably adopted for radial tires for passenger cars and run-flat tires. The inventive green tire is more advantageous when used for heavy load radial tires for trucks and buses, particularly large-size heavy load tires described below. (In the large-size heavy load tires, steel cords are used for the carcass cords, and a distance L between the outer surface so of the side wall portion 3 and the carcass 6 at the middle point of the radial width of the outer surface so is not less than 4.0 mm.) The large-size heavy load tires experience a large degree of load, and to improve efficiency in manufacture, are required to use large-size rubber tapes, whose relative thickness and width are large, for the side wall rubbers G. This creates a tendency toward cracking on the side wall portions 3. The method for manufacturing according to the present invention can be applied to such large-size heavy load tires to provide for the effect of inhibiting cracking in an excellent manner while keeping efficiency in manufacture high.

While the present invention has been described in detail by way of preferred embodiments, the present invention is not limited to the preferred embodiments described above and illustrated in the drawings and various modifications are possible.

Example 1

Sample radial tires for passenger cars having the size 195/55R16 were prepared from green tires having the structure illustrated in FIG. 1 and specifications listed in Table 1. Also sample radial tires for passenger cars having the size 205/55R16 were prepared from green tires having specifications listed in Table 2. The two kinds of sample tires were subjected to a test for cracking resistivity. The results are shown in Tables 1 and 2. The sample tires are the same in other specifications than those listed in Tables 1 and 2.

<Cracking Resistivity Test>

The sample tires were run on drums at a speed of 50 km/h with as low an internal pressure as 50% of the standard pressure and with as heavy a load as 150% of the standard load. The running period of time before occurrence of cracking on the outer surface of each side wall portion is shown by an index relative to the running period of time in, in Table 1, comparative example 1, which is taken to be 100, and in Table 2, example 12, which is taken to be 100. A larger index indicates superior cracking resistivity.

The term standard pressure, as used herein, refers to an air pressure specified as corresponding to the tire in a standard system encompassing the standard upon which the tire is based. For example, the standard pressure is the maximum air pressure in JATMA, the maximum pressure given in the "TIRE LOAD LIMITS AT VARIOUS COLD INFLATION PRESSURES" table in TRA, or the "INFLATION PRESSURE" in ETRTO. For tires for passenger cars, the standard pressure is 180 kPa. The term standard load, as used herein, refers to a load specified as corresponding to the tire in a standard system encompassing the standard upon which the tire is based. For example, the standard load is the maximum load capacity in JATMA, the maximum load given in the "TIRE LOAD LIMITS AT VARIOUS COLD INFLATION PRESSURES" table in TRA, or the "LOAD CAPACITY" in ETRTO.

TABLE 1

| <Winding on the surface layer> | Comparative example 1 | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Cross sectional shape | Rhomboid | Rhomboid | Rhomboid | Rhomboid | Rhomboid | Rhomboid | Rhomboid | Rhomboid | Rhomboid | Rhomboid | Rhomboid | Rhomboid |
| Tape width W1 (mm) | 25 | 25 | 25 | 25 | 25 | 25 | 25 | 25 | 20 | 10 | 20 | 20 |
| Maximum thickness T1 (mm) | 2.5 | 2.5 | 2.5 | 2.5 | 2.5 | 2.5 | 0.8 | 1.5 | 2.5 | 2.5 | 2.5 | 2.5 |
| Angle theta (degrees) | 35 | 25 | 15 | 10 | 5 | 3 | 15 | 15 | 25 | 21 | 23 | 16 |
| Exposure width Wa (mm) | 5 | 13 | 14 | 16 | 17 | 20 | 16 | 16 | 15 | 5 | 15 | 15 |
| Ratio Wa/W1 | 0.20 | 0.52 | 0.56 | 0.64 | 0.68 | 0.80 | 0.64 | 0.64 | 0.75 | 0.50 | 0.75 | 0.75 |
| Number n of winding (times) | 20 | 9 | 7 | 6 | 5 | 4 | 7 | 7 | 8 | 14 | 7 | 6 |
| n × (W1/W2) | 4.3 | 1.96 | 1.52 | 1.30 | 1.09 | 0.87 | 1.52 | 1.52 | 1.39 | 1.22 | 1.22 | 1.04 |
| Interface angle alpha (degrees) | 37 | 28 | 21 | 18 | 13 | 11 | 14 | 19 | 45 | 30 | 30 | 20 |
| Cracking resistivity | 100 | 123 | 170 | 185 | 215 | 230 | 136 | 151 | 126 | 142 | 144 | 143 |

TABLE 2

| <Winding on the surface layer> | Example 12 | Example 13 | Example 14 | Example 15 | Example 16 | Example 17 |
|---|---|---|---|---|---|---|
| Cross sectional shape | Rhomboid | Rhomboid | Rhomboid | Rhomboid | Rhomboid | Rhomboid |
| Tape width W1 (mm) | 10 | 10 | 10 | 10 | 10 | 10 |
| Maximum thickness T1 (mm) | 2.5 | 2.5 | 2.5 | 2.5 | 2.5 | 2.5 |
| Angle theta (degrees) | 35 | 25 | 23 | 21 | 18 | 16 |
| Exposure width Wa (mm) | 5 | 6 | 6.5 | 7 | 8 | 9 |
| Ratio Wa/W1 | 0.5 | 0.6 | 0.65 | 0.7 | 0.8 | 0.9 |
| Number n of winding (times) | 22 | 20 | 18 | 16 | 14 | 12 |
| n × (W1/W2) | 2.2 | 2 | 1.8 | 1.6 | 1.4 | 1.2 |
| Interface angle alpha (degrees) | 38 | 26 | 24 | 23 | 20 | 19 |
| Cracking resistivity | 100 | 111 | 125 | 138 | 140 | 141 |

Example 2

Sample run-flat tires having the size 245/40R18 were prepared from green tires having the structure illustrated in FIG. 7 and specifications listed in Table 3. The sample tires were subjected to a test for run-flat durability. The results are shown in Table 3. The sample tires are the same in other specifications than those listed in Table 3.

<Run-Flat Durability>

Each of the sample tires was mounted on a 18×8.5 JJ rim without a valve core, deflated, and run on a drum at a speed of 80 km/h with a longitudinal load of 4.14 kN, which was 65% of the standard load, and at room temperature (38°+2°). The distance over which each tire was run before the tire was broken is shown by an index relative to the running distance in comparative example 1, which is taken to be 100. A larger index indicates superior run-flat durability.

TABLE 3

| <Winding on the surface layer> | Comparative example 1 | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Cross sectional shape | Rhomboid | Rhomboid | Rhomboid | Rhomboid | Rhomboid | Rhomboid | Rhomboid | Rhomboid | Rhomboid | Rhomboid | Rhomboid | Rhomboid |
| Tape width W1 (mm) | 10 | 10 | 10 | 10 | 10 | 10 | 10 | 10 | 20 | 20 | 25 | 25 |
| Maximum thickness T1 (mm) | 2.5 | 2.5 | 2.5 | 2.5 | 2.5 | 2.5 | 0.8 | 1.5 | 2.5 | 2.5 | 1.0 | 1.0 |
| Angle theta (degrees) | 35 | 25 | 15 | 10 | 5 | 3 | 15 | 15 | 5 | 10 | 5 | 10 |
| Exposure width Wa (mm) | 3 | 4 | 5 | 6 | 7 | 8 | 6 | 6 | 16 | 10 | 20 | 12 |
| Ratio Wa/W1 | 0.3 | 0.5 | 0.6 | 0.6 | 0.7 | 0.8 | 0.6 | 0.6 | 0.8 | 0.5 | 0.8 | 0.5 |
| Number n of winding (times) | 21 | 16 | 13 | 11 | 10 | 9 | 11 | 11 | 4 | 6 | 3 | 5 |
| n × (W1/W2) | 3 | 2.3 | 1.9 | 1.6 | 1.4 | 1.2 | 1.6 | 1.6 | 1.2 | 1.7 | 1.2 | 1.2 |
| Interface angle alpha (degrees) | 35 | 30 | 28 | 25 | 23 | 20 | 24 | 24 | 18 | 22 | 10 | 12 |
| Run-flat durability | 100 | 135 | 180 | 193 | 220 | 251 | 139 | 141 | 300 | 263 | 350 | 310 |

What is claimed is:

1. A green tire comprising a surface layer defining a green tire surface and made up of a plurality of windings of at least one unvulcanized rubber tape having a tape width (W1) of from 5 to 50 mm, wherein in said surface layer,
said windings are each overlapped with the adjacent windings, and
a part of each of said windings is exposed on said green tire surface so that the exposed part has a width (Wa) in a range of from 50% to 80% of said tape width (W1),
each said winding has a cross-sectional shape being substantially rhomboid and having one end at an acute angle corner exposed on said green tire surface and the other end at the opposing acute angle corner, and
an angle theta of a diagonal line of said rhomboid drawn between the one end and the other end is not more than 30 degrees with respect to a tangential line to a profile line (Y) of said green tire surface at a point corresponding to said one end on said profile line (Y),
said profile line (Y) is defined as a line smoothly contacting to exposed surface of each said exposed part of said windings and is substantially parallel to a line (Y1) smoothly connecting the one ends of the windings, and
said point corresponding to said one end is defined as a point at which a line passing through said one end crosses at right angle to said profile line (Y),
wherein
an intersecting angle alpha of each interface between the adjacent windings is not more than 30 degrees,
said intersecting angle alpha is defined as an angle between said tangential line to the profile line at the point corresponding to said one end and a straight line drawn between said one end and a point of intersection between the interface and an imaginary reference line (Yx) extensive in parallel to the profile line (Y) at a distance of 1 mm inwardly from said one end, and
said green tire surface is a part of the outer surface of each of sidewall portions of the green tire such that a part of each of said windings are exposed on said outer surface of each of said sidewall portions of the green tire.

2. The green tire according to claim 1, wherein the width (Wa) of the exposed part is not less than 5.0 mm.

3. The green tire according to claim 1, wherein the rubber tape has a maximum thickness in a range of from 0.3 to 5.0 mm.

4. The green tire according to claim 1, wherein said angle theta is not more than 5 degrees.

5. The green tire according to claim 1, wherein the number (n) of the windings of the surface layer is:

$$N \leq 2.0 \times (W2/W1) \quad (1)$$

wherein W2 is the width of said surface layer measured along said green tire surface.

6. The green tire according to claim 1, wherein said interface does not protrude beyond said straight line in a direction in which said angle alpha increases.

7. The green tire according to claim 1, wherein said green tire surface is a part of the inner surface of each of sidewall portions of the green tire.

8. A method for manufacturing a pneumatic tire comprising a step of building a green tire which has a surface layer defining a green tire surface, and a step of heating said green tire, wherein
said step of building a green tire includes a step of forming said surface layer by a plurality of windings of at least one unvulcanized rubber tape having a tape width (W1) of from 5 to 50 mm, in said surface layer,
said windings are each overlapped with the adjacent windings, and
a part of each of said windings is exposed on said green tire surface so that the exposed part has a width (Wa) in a range of from 50% to 80% of said tape width (W1),
each said winding has a cross-sectional shape being substantially rhomboid and having one end at an acute angle corner exposed on said green tire surface and the other end at the opposing acute angle corner, and
an angle theta of a diagonal line of said rhomboid drawn between the one end and the other end is not more than 30 degrees with respect to a tangential line to a profile line (Y) of said green tire surface at a point corresponding to said one end on said profile line (Y),
said profile line (Y) is defined as a line smoothly contacting to exposed surface of each said exposed part of said windings and is substantially parallel to a line (Y1) smoothly connecting the one ends, and
said point corresponding to said one end is defined as a point at which a line passing through said one end crosses at right angle to said profile line (Y),
wherein
an intersecting angle alpha of each interface between the adjacent windings is not more than 30 degrees,
said intersecting angle alpha is defined as an angle between said tangential line to the profile line (Y) at the point corresponding to said one end and a straight line drawn between said one end and a point of intersection between the interface and an imaginary reference line (Yx) extensive in parallel to the profile line (Y) at a distance of 1 mm inwardly from said one end, and
said green tire surface is a part of the outer surface of each of sidewall portions of the green tire such that a part of each of said windings are exposed on said outer surface of each of said sidewall portions of the green tire.

9. The method for manufacturing a pneumatic tire according to claim 8, wherein the width (Wa) of the exposed part is not less than 5.0 mm.

10. The method for manufacturing a pneumatic tire according to claim 8, wherein the rubber tape has a maximum thickness in a range of from 0.3 to 5.0 mm.

11. The method for manufacturing a pneumatic tire according to claim 8, wherein said angle theta is not more than 5 degrees.

12. The method for manufacturing a pneumatic tire according to claim 8, wherein the number (n) of the windings of the surface layer is:

$$n \leq 2.0 \times (W2/W1) \quad (1)$$

wherein W2 is the width of said surface layer measured along said green tire surface.

13. The method for manufacturing a pneumatic tire according to claim 8, wherein said interface does not protrude beyond said straight line in a direction in which said angle alpha increases.

14. The method for manufacturing a pneumatic tire according to claim 8, wherein said green tire surface is a part of the inner surface of each of sidewall portions of the green tire.

* * * * *